US009861185B2

(12) United States Patent
Southgate et al.

(10) Patent No.: US 9,861,185 B2
(45) Date of Patent: Jan. 9, 2018

(54) FASTENER-STICK DISPENSERS FOR FIELD USE

(71) Applicant: John Paul Southgate, Barre, VT (US)

(72) Inventors: John Paul Southgate, Marshfield, VT (US); Matthew Flego, Burlington, VT (US)

(73) Assignee: John Paul Southgate, Barre, VT (US)

( * ) Notice: Subject to any disclaimer, the term of this patent is extended or adjusted under 35 U.S.C. 154(b) by 0 days.

(21) Appl. No.: 14/801,502

(22) Filed: Jul. 16, 2015

(65) Prior Publication Data

US 2016/0183669 A1 Jun. 30, 2016

Related U.S. Application Data

(63) Continuation-in-part of application No. 14/137,035, filed on Dec. 20, 2013, now abandoned.

(Continued)

(51) Int. Cl.

*F42B 39/02* (2006.01)
*G07F 11/16* (2006.01)

(Continued)

(52) U.S. Cl.

CPC ................ *A45F 5/021* (2013.01); *B25C 3/00* (2013.01); *B25C 5/1679* (2013.01); *B25C 7/00* (2013.01);

(Continued)

(58) Field of Classification Search

CPC ...... A45F 5/21; A45F 2200/0575; B25C 3/00; B25C 5/1679; B25C 7/00; B65D 83/00; Y10T 29/49826

(Continued)

(56) References Cited

U.S. PATENT DOCUMENTS 1,718,572 A * 6/1929 Marcuse ................ B65D 5/724 206/254
2,342,671 A * 2/1944 Kilpatrick .............. B65D 71/00 206/340

(Continued)

OTHER PUBLICATIONS

Related U.S. Appl. No. 14/137,035, filed Dec. 20, 2013, entitled "Fastener-Stick Dispenser for Field Use, and Method of Providing Same."
Restriction Requirement dated Mar. 16, 2015, in related U.S. Appl. No. 14/137,035, filed Dec. 20, 2013, entitled "Fastener-Stick Dispenser for Field Use, and Method of Providing Same."

*Primary Examiner* — Rakesh Kumar
(74) *Attorney, Agent, or Firm* — Downs Rachlin Martin PLLC

(57) ABSTRACT

A fastener-stick dispenser for dispensing sticks of fasteners, such as staples, nails, and screws. In some embodiments, the dispenser includes a body defining a fastener-stick receptacle that receives a plurality of the fastener sticks. The dispenser also includes a dispensing port through which fastener sticks are dispensed one or more at a time by a user. The dispenser may also include one or more securing device for securing the dispenser to a user so that the user can carry the dispenser in a hands-free manner. A method of providing a fastener-stick dispenser is also disclosed. The method includes providing a fastener stick dispenser and providing various instructions for its use. In some embodiments, the dispenser includes a pivotable dispensing mechanism designed, configured, and arranged to dispense fastener sticks in a direction perpendicular to the longitudinal axes of the fastener sticks. The dispensing mechanism may be actuated using a lever arm.

17 Claims, 11 Drawing Sheets

Related U.S. Application Data

(60) Provisional application No. 61/740,591, filed on Dec. 21, 2012, provisional application No. 61/114,318, filed on Feb. 10, 2015.

(51) Int. Cl.

| | |
|---|---|
| ***B65G 59/00*** | (2006.01) |
| ***B65H 3/00*** | (2006.01) |
| ***A45F 5/02*** | (2006.01) |
| ***B65D 83/00*** | (2006.01) |
| ***B25C 5/16*** | (2006.01) |
| ***B25C 7/00*** | (2006.01) |
| ***B25C 3/00*** | (2006.01) |

(52) U.S. Cl.
CPC ...... *B65D 83/00* (2013.01); *A45F 2200/0575* (2013.01); *Y10T 29/49826* (2015.01)

(58) Field of Classification Search
USPC ........ 221/185, 268, 197, 255, 264, 229, 271
See application file for complete search history.

(56) References Cited

U.S. PATENT DOCUMENTS

| | | | | |
|---|---|---|---|---|
| 3,313,452 | A * | 4/1967 | Katz | A47K 5/08 221/197 |
| 3,511,409 | A * | 5/1970 | Huck | A61J 7/04 221/231 |
| 5,048,720 | A * | 9/1991 | Hoke | B65D 83/0418 221/198 |
| 5,069,451 | A * | 12/1991 | Martens | A63B 47/002 124/47 |
| 9,072,364 | B2 * | 7/2015 | Johnson | A45F 5/02 |
| 9,113,729 | B2 * | 8/2015 | Righetti | A47F 1/10 |
| 2002/0117511 | A1 * | 8/2002 | McNabb | A47L 15/4454 221/197 |
| 2011/0223291 | A1 * | 9/2011 | Shecter | B65D 85/60 426/104 |
| 2014/0175114 | A1 | 6/2014 | Southgate | |
| 2016/0183669 | A1 * | 6/2016 | Southgate | B25C 3/00 221/185 |

* cited by examiner

FASTENER-STICK DISPENSERS FOR FIELD USE

RELATED APPLICATION DATA

This application is a continuation-in-part of U.S. patent application Ser. No. 14/137,035 filed on Dec. 20, 2013, and titled “FASTENER STICK DISPENSER FOR FIELD USE, AND METHOD OF PROVIDING SAME,” which claims the benefit of priority of U.S. Provisional patent application Ser. No. 61/740,591, filed on Dec. 21, 2012, and titled “FASTENER STICK DISPENSER FOR FIELD USE”. This application also claims the benefit of priority of U.S. Provisional patent application Ser. No. 62/114,318, filed on Feb. 10, 2015, and titled “SIDE-DISCHARGE FASTENER STICK DISPENSER.” Each of these applications is incorporated herein by reference in its entirety.

FIELD OF THE INVENTION

The present invention generally relates to the field of hand tools. In particular, the present invention is directed to a fastener-stick dispensers for field use.

BACKGROUND

In contemporary construction, numerous construction components are fastened to support members using staples and nails dispensed from tools that utilize fastener “sticks” composed of a plurality of fasteners lightly glued or otherwise secured together for convenient handling and loading by workers. For example, sheet products such as plastic, house wrap, tar paper, etc., are fastened to support members, for example, sheet members (e.g., plywood, particleboard, etc.) and framing members, such as wood studs. Typically, these products are secured with “slap staplers” that insert a relatively small staple through the sheet and into a supporting member. Fastening sheet products in this manner is a quick and common process. Staples for slap staplers typically come in stick form as noted above, and the sticks are sold in cardboard boxes of multiple sticks. At a construction site, when a worker needs to load a slap stapler, he/she takes a stick from the box and inserts it into the stapler. Very often, these boxes become broken or wet as they undergo the jostling and crushing inherent in construction conditions. Once the boxes have failed, the sticks of staples often become unusable, because they break into tiny sections that are too time consuming to load into the stapler. A result is wasted money.

SUMMARY OF THE INVENTION

In one implementation, the present disclosure is directed to a fastener-stick dispenser for dispensing fastener sticks each having a longitudinal axis. The fastener-stick dispenser includes a housing defining a fastener-stick dispensing receptacle designed and configured to receive a plurality of fastener-sticks for dispensing; a dispensing mechanism pivotably coupled relative to said housing, said dispensing mechanism including a fastener-stick receiving region designed and configured to receive, from said fastener-stick dispensing receptacle, one or more of said plurality of fastener-sticks, said fastener-stick receiving region having a receiving position that is in operative communication with said fastener-stick receptacle; and a dispensing position located outside of said housing; and an actuator designed and configured, upon actuation by a user, to move said fastener-stick receiving region from said receiving position to said dispensing position in a direction perpendicular to the longitudinal axis of the one or more fastener-sticks in said fastener-stick receiving region so as to make the one or more fastener-sticks in said fastener-stick receiving region available to the user; and a securing device designed and configured for securing the fastener-stick dispenser to the user during use of the fastener-stick dispenser.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
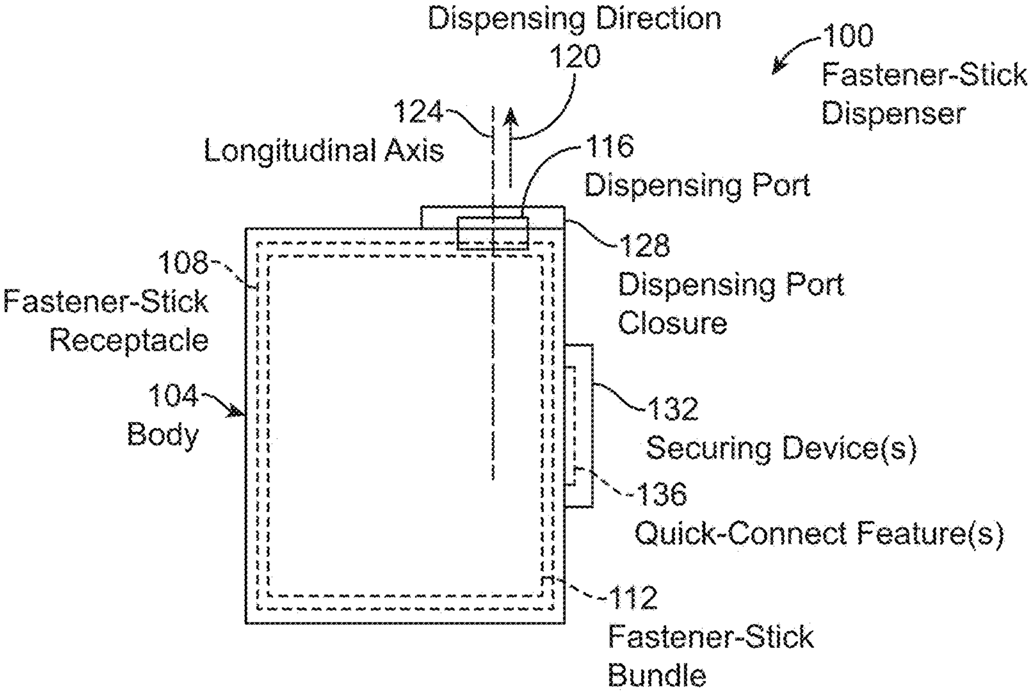
FIG. 1 is a high-level block diagram of a fastener-stick dispenser made in accordance with the present invention.
Figure 18:
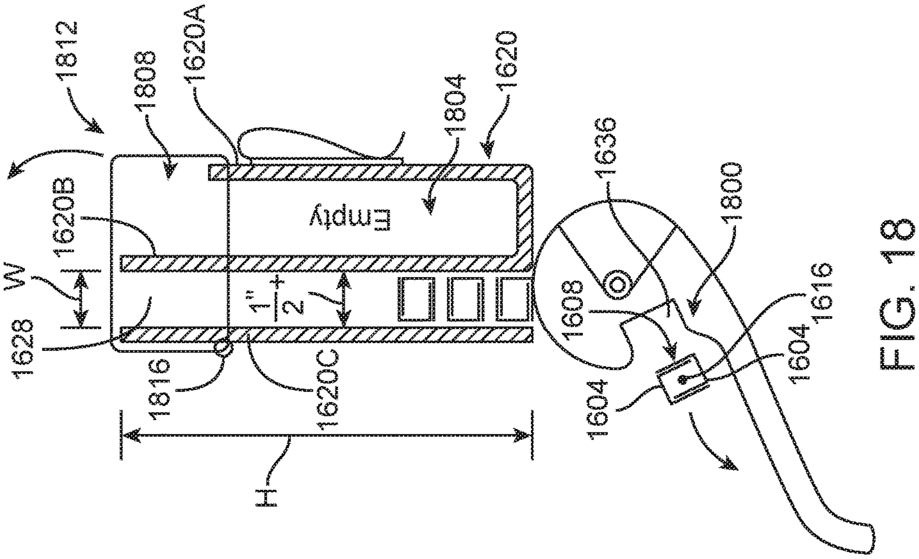
FIG. 18 is a further enlarged elevational cross-sectional view of the fastener-stick dispenser of FIGS. 16 and 17, illustrating the dispensing mechanism in a fastener-stick-dispensing position.
Figure 17:
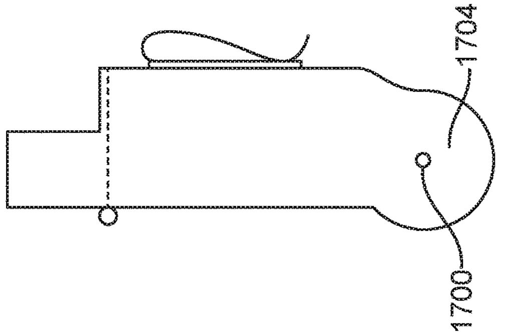
FIG. 17 is an enlarged end elevational view of the housing of the fastener-stick dispenser of FIG. 16.
Figure 16:
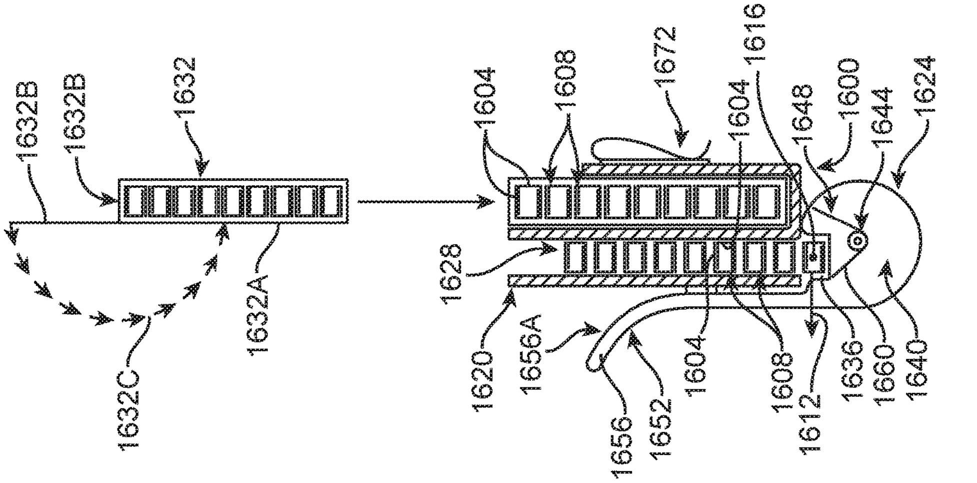
FIG. 16 is an elevational cross-sectional view of an exemplary alternative fastener-stick dispenser made in accordance with the present invention, illustrating a dispensing mechanism in a fastener-stick-receiving position and a package of fasteners being inserted into a fastener-stick storage receptacle.

In one aspect, the present disclosure is directed to a dispenser for dispensing sticks of fasteners, such as staples or nails. FIG. 1 depicts a fastener-stick dispenser 100 made in accordance with some aspects the present invention from a functional perspective. In other words, fastener-stick dispenser 100 of FIG. 1 should not be interpreted as depicting any particular physical form of a fastener-stick dispenser. In contrast, the following FIGS. 6-14 depict several physical instantiations of fastener-stick dispensers made in accordance with the present invention and including the functionalities depicted in FIG. 1. FIGS. 16-18 depict an example of another physical instantiation of a fastener-stick dispenser made in accordance with the present invention.

Figure 2:
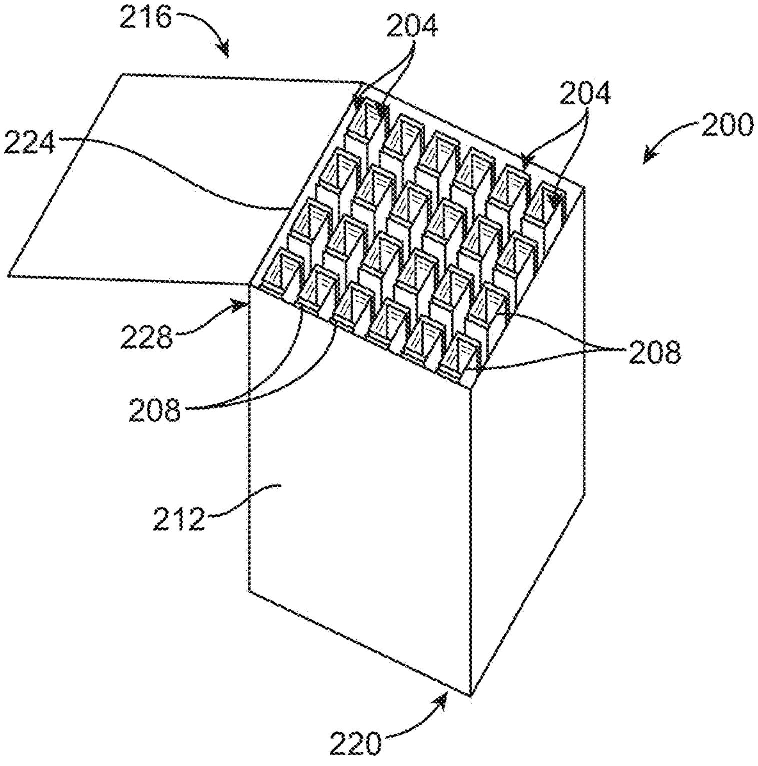
FIG. 2 is an isometric view of a prepackaged box of fastener sticks, here staple sticks, suitable for use with a fastener-stick dispenser made in accordance with the present invention.

Referring now to the drawings in detail, as seen in FIG. 1, fastener-stick dispenser 100 includes a body 104 defining a fastener-stick receptacle 108 for receiving a bundle 112 of fastener sticks (not individually depicted in FIG. 1). In the context of this disclosure and the claims appended hereto, "bundle" should not be taken to require that the sticks be tied or otherwise held together in forming the bundle, though in some cases, this may be the case. Rather, "bundle" should be construed as a discrete grouping of a plurality of individual fastener sticks. In some embodiments, fastener-stick receptacle 108 is designed and configured to receive a prepackaged box of fastener sticks, FIG. 2 illustrates a prepackaged box 200 of fastener sticks, in this case, sticks 204 of staples 208, such as staples for a slap stapler (e.g., of the sort used for installing roofing felt, building wrap, etc.) or staple gun. It is noted that only a couple of sticks 204 and a couple of staples 208 are labeled for convenience. In this example, fastener sticks 204 are bundled and held by a prepackaging box 212 having a pair of opposing end portions 216 and 220. In this connection, a "prepackaging box," such as prepackaging box 212 is a container in which fastener sticks, such as fastener sticks 204, are shipped and sold.

In one example of using prepackaged box 200 with fastener-stick dispenser 100 of FIG. 1, a user would simply open one end of the box, such as end portion 216, or suitable portion thereof, prior to inserting the box into the fastener-stick receptacle. In some cases, the user may leave one edge of end portion 216 attached to a side of prepackaging box 212, such as edge 224 attached to side 228, and fold the end portion over to that side. In other cases, the user may completely remove the entire end portion, such as end portion 216. In yet other cases, the end portion may include two or more flaps, and the user may fold and/or remove one or more of the flaps to allow fastener-stick dispenser to function properly, as described below. Referring again to FIG. 1, configuring fastener-stick receptacle 108 to receive an entire box of fastener sticks has an advantage of not requiring the user to handle the sticks during loading of the fastener-stick receptacle. In other embodiments, however, fastener-stick receptacle 108 can, for example, be designed and configured to receive the contents of a full box of sticks without the box, to receive only a portion of the contents of a full box of sticks, or to receive the contents of multiple boxes of sticks. In each case, the grouping of such fastener sticks within fastener-stick receptacle, despite the absence of a box or other holding device or structure, are considered to be bundled together for the purpose of this disclosure and set of appended claims.

Figure 3A:
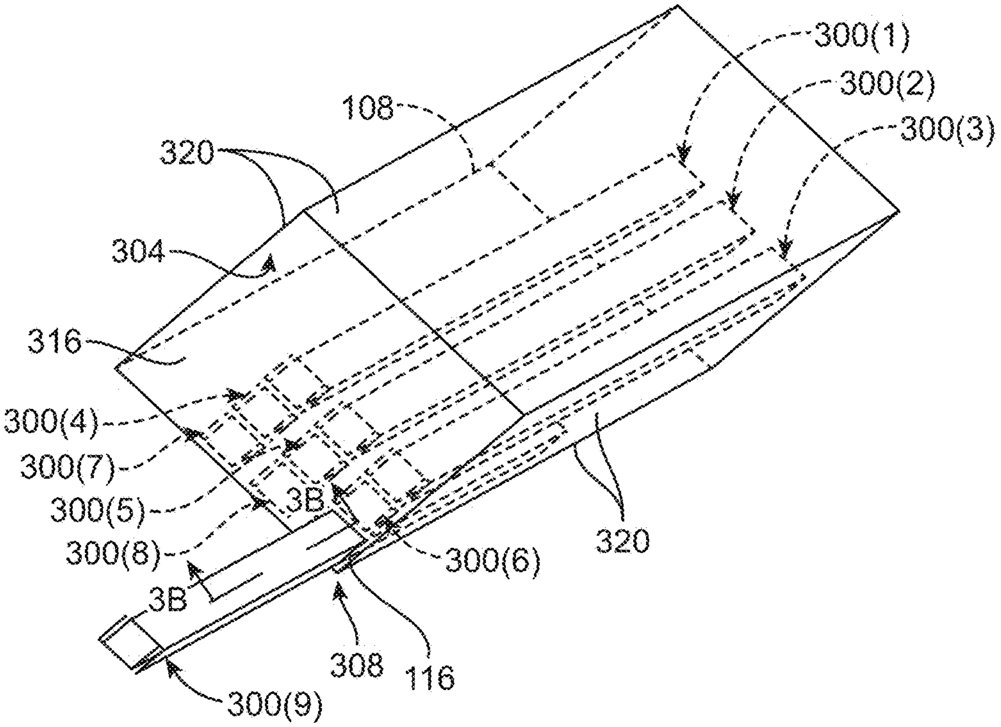
FIG. 3A is an isometric view of a fastener-stick dispenser illustrating an exemplary location of a dispensing port of a fastener-stick dispenser made in accordance with the present invention, showing fastener sticks all contained in the fastener-stick receptacle.

With continuing reference to FIG. 1, body 104 of fastener-stick dispenser 100 includes a dispensing port 116 for allowing one or more of the fastener sticks to be dispensed from fastener-stick receptacle 108 along a dispensing direction 120 that is parallel to the longitudinal axes of the individual fastener sticks, one such longitudinal axis 124 being shown in FIG. 1. As depicted in FIG. 3A, fastener-stick receptacle 108 may have a rectangular transverse cross-section shaped to receive a corresponding prepackaged box of fastener sticks and/or a generally rectangular bundle of fastener sticks, here staple sticks in nested pairs 300(1) to 300(9), dispensing port 116 may be located at one end 304 of fastener-stick receptacle 108 and at one of the corners, here, corner 308 of the rectangular shape. During dispensing and as described in more detail below, corner 308 having dispensing port 116 (or, "dispensing corner") is generally located at the lowest point during the dispensing operation, and, therefore, the fastener sticks settle so that any of the sticks remaining in fastener-stick receptacle 108 tend to settle in that corner so as to be available at the dispensing port for dispensing. Generally, dispensing port 116 is made to be slightly larger than a fastener stick or, as shown in FIG. 3A in the case of each pair 300(1) to 300(9) of nested staple sticks, a pair of the nested fastener sticks, so that any adjacent fastener sticks (or pairs) adjacent to the stick(s) being dispensed are retained in fastener-stick receptacle 108.

Figure 3B:
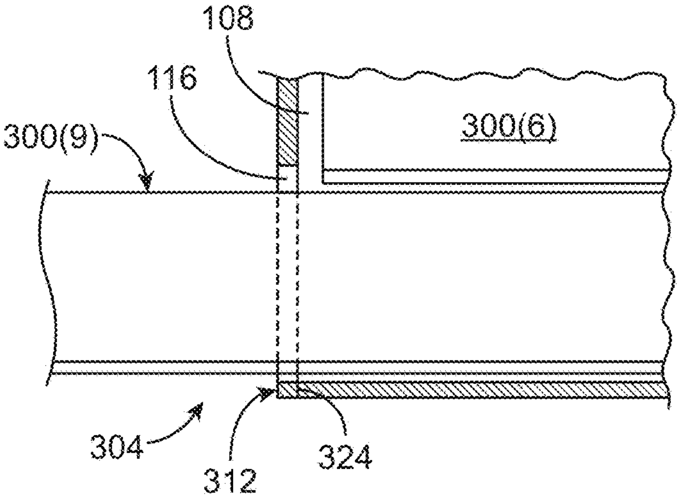
FIG. 3B is an enlarged cross-sectional view taken along line 3B-3B of FIG. 3A.
Figure 4A:
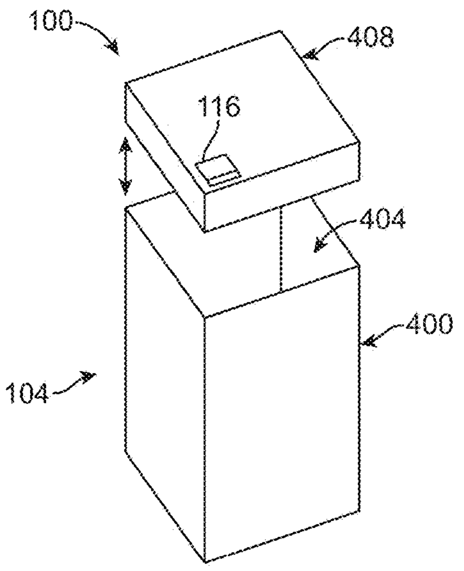
FIG. 4A is an exploded isometric view of a top-loading fastener-stick dispenser having a top dispensing port and a top dispensing-port closure.
Figure 4B:
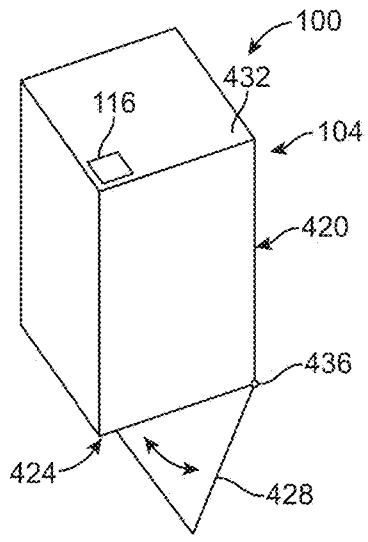
FIG. 4B is an isometric view of a bottom-loading fastener-stick dispenser having a top dispensing port and a bottom dispensing-port closure.
Figure 4C:
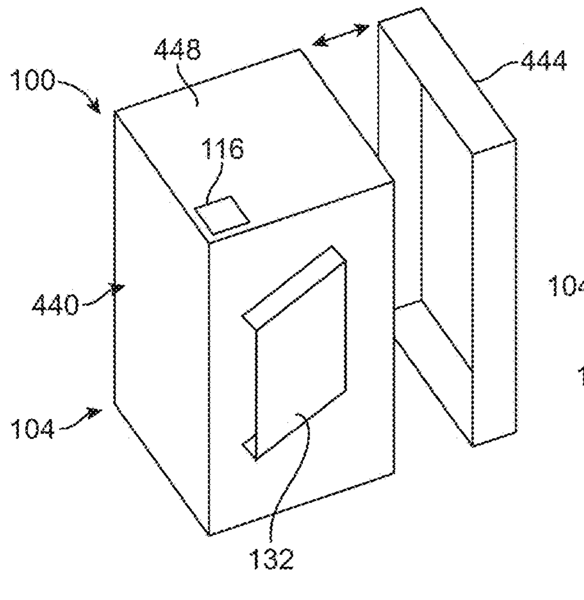
FIG. 4C is an exploded isometric view of a side-loading fastener-stick dispenser having a top dispensing port and side dispensing-port closure.

As illustrated particularly in FIG. 3B, typically one edge 312 of dispensing port 116 is flush or nearly flush with dispensing corner 308 of fastener-stick receptacle 108 so that the sticks or pairs, here, pairs 300(1) to 300(9) being dispensed through the dispensing port have little or no interference to sliding along the dispensing corner through the dispensing port. Depending on the configuration of fastener-stick dispenser 100, dispensing port 116 can be located, for example, in an end wall 316 that is continuous with the sidewalls 320 or otherwise fixedly secured thereto (e.g., when the dispenser is a "bottom-loading" dispenser, a "side-loading" dispenser, or a "pull-apart" dispenser) or in a closure that is removably attached to, and therefore separate from, sidewall 320, as illustrated by optional separation line 324 (e.g., when the dispenser is a "top-loading" dispenser). While the terms "bottom loading" and "top loading" should be self-evident, an example of a "pull-apart" dispenser is a dispenser having two parts, a "bottom" part receiving a box of fastener sticks such that the upper half of the box extends out of the half, and a "top" part covering the upper half of the box and securable to the bottom part. FIGS. 4A to 4C illustrate various configurations of body 104 to suit various ways of loading fastener sticks into fastener-stick receptacle 108.

Referring to FIG. 4A, in this embodiment fastener-stick dispenser 100 has a two-part body 104 that includes a five-sided main housing 400 substantially defining fastener-stick receptacle 108. Main housing 400 has a top opening 404, and a top closure 408 is secured to the main housing to close the top opening. Top closure 408 is (re)movably secured to main housing 400 to allow for easy loading of fastener-stick receptacle 108 along dispensing direction 120. Top closure 408 may be completely removable from main housing 400 for fastener-stick loading and unloading operations, for example, in the manner of a removable cap as shown, or may be movable relative to the main housing but remain attached thereto at all times, such as by a hinge (not shown) or sliding engagement, among others. In this example, dispensing port 116 is part of top closure 408, but it could be at the opposite end of dispenser 100.

FIG. 4B also illustrates an embodiment of fastener-stick dispenser 100 having a two-part body 104 that includes a five-sided main housing 420 like the embodiment of FIG. 4A. However, instead of having a top opening 404 and a top closure 408, the embodiment of FIG. 4B has a bottom opening 424 and a bottom closure 428 that allow for the installation of fastener sticks into fastener-stick receptacle 108. In the embodiment of FIG. 4B, dispensing port 116 and dispensing-port closure 128 are in a top endwall 432 of main housing 420. All other aspects of the embodiment of FIG. 4B can be the same as or similar to the embodiment of FIG. 4A. As shown in FIG. 4B, bottom closure 426 is movably attached to main housing 420 via a hinge 436.

FIG. 4C illustrates an embodiment of fastener-stick dispenser 100 that also has a two-part body 104 that includes a five-sided main housing 440 and a side closure 444 that allows for loading of fastener sticks, such as bundle 112, into fastener-stick receptacle 108 in a direction perpendicular to dispensing direction 120. It is noted that side closure 444 can be located on any side of main housing 440, including the side that includes securing device(s) 132. As with other embodiments, fastener-stick dispensing port 116 is located on an end 448 of dispenser 100. Side closure 444 may be completely removable from main housing 440 for fastener-stick loading and unloading operations, for example, in the manner of a removable cap, or may be movable relative to the main housing but remain attached thereto at all times, such as by a hinge (not shown) or sliding engagement (not shown), among others.

Figure 4D:
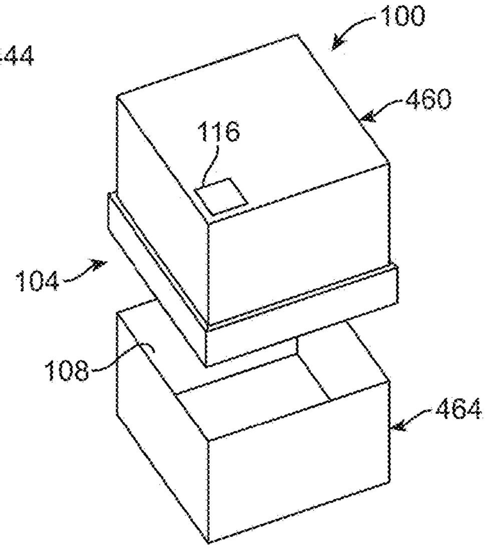
FIG. 4D is an exploded isometric view of a split-body fastener-stick dispenser having a top dispensing port and a two-part housing.

FIG. 4D illustrates an embodiment of fastener-stick dispenser 100 having a two part body 104, but instead of there being a "main" housing as in the embodiments of FIGS. 4A to 4C, in the embodiment of FIG. 4D the body is split into two generally similar parts, here an upper part 460 and a lower part 464. When coupled together, upper and lower parts 460, 464 define fastener-stick receptacle 108. One or the other, or perhaps even both, of upper and lower parts 460, 464 can be provided with a corresponding dispensing port 116. Similar to other embodiments described herein, upper and lower parts 460, 464 can be completely separable or secured together in a manner, such as via a hinge (not shown), that allows a user to load fastener sticks into fastener-stick receptacle 108. Those skilled in the art will readily appreciate that the embodiments shown in FIGS. 4A to 4D are merely exemplary and that other configurations of body 104 are possible.

Referring again to FIG. 1, fastener-stick dispenser 100 further includes a dispensing-port closure 128 that allows a user to open and close dispensing port 116 for dispensing fastener sticks contained in fastener-stick receptacle 108. Dispensing port closure 128 can be of any suitable type, such as a hinged closure that pivots toward and away from the dispensing port in a direction generally parallel to dispensing direction 120 or a sliding closure (e.g., pivoting or linear) that a user moves in a direction perpendicular to the dispensing direction to open and close the dispensing port, among others. In some embodiments, the dispensing-port closure 128 is provided with one or more features (e.g., fixed knob(s), handle(s), tab(s), overhang(s), etc.) and/or mechanism (e.g., lever, dial, knurled wheel, etc.) that makes it easy for a user wearing construction gloves to readily open and close the dispensing-port closure. Some exemplary physical instantiations of dispensing-port closure 128 are illustrated in the embodiments shown in FIGS. 6 to 14. However, those skilled in the art will readily understand the wide variety of closures and/or appurtenances thereto that can be used for and/or with dispensing-port closure 128.

Figure 5:
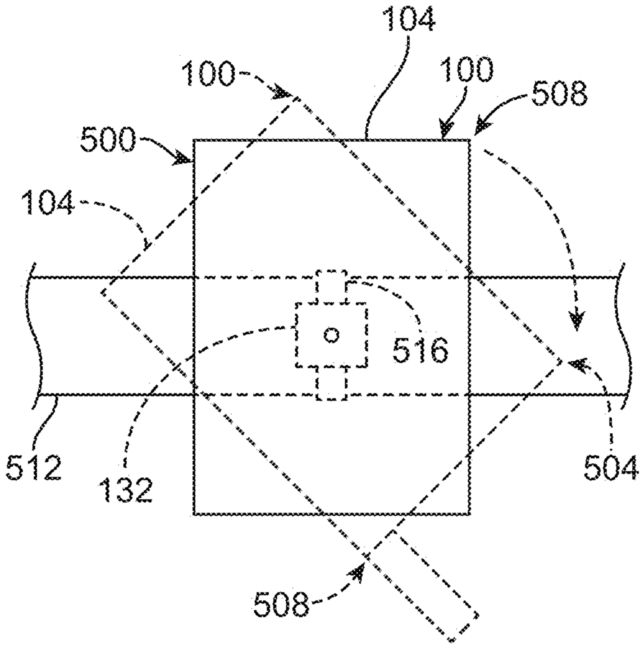
FIG. 5 is a side elevational view of a fastener-stick dispenser having a pivotable securing device that allows the body of the dispenser to be pivoting during use.

Referring still to FIG. 1, fastener-stick dispenser 100 may also include one or more securing devices 132 for securing the dispenser to a user or an article of clothing or accessory worn by the user. Examples of securing devices include, but are not limited to, belt loops, belt hooks, belts, straps, lanyards, and hooks, among others. Depending on securing device(s) 132 used, body 104 can be made to be pivotable or swivelable relative to the user so as to allow the user to pivot fastener-stick dispenser 100 as needed to alternatingly into and out of a dispensing position. For example, in some embodiments, fastener-stick dispenser 100 may have an upright stowed position in which dispensing port 116 is located generally at the highest part of the dispenser. Correspondingly, fastener dispenser 100 may also have a dispensing position in which dispensing port 116 is located generally at the lowest part of the dispenser. If securing device 132 includes, for example, a belt loop or other structure that secures fastener-stick dispenser 100 to a belt (not shown) of the user such that the belt loop stays fixed, body 104 may be pivotable relative to the belt and belt loop so as to allow the body to pivot relative to the belt loop so that the user can pivot the dispenser between the stowed and dispensing positions. This is illustrated in FIG. 5 that illustrates a version of fastener-stick dispenser 100 in which securing device 132 (which is on the back side of the dispenser in FIG. 5) is configured to allow the user (not shown) to pivot body 104 from a non-dispensing position, such as the upright position 500 shown, to a dispensing position 504, here with a dispensing corner 508 being angled downward and with dispensing port 116 generally at the lowest point of the dispenser. In this example, securing device 132 includes a belt loop 512 that receives a work belt 516 worn by a user, not shown. In this disclosure and in the present claims, a "work belt" is any belt worn by a user while using a fastener-stick dispenser according to the present invention, including, but not limited, to a trouser belt, tool belt, and a safety-harness belt. Those skilled in the art will readily understand the wide variety of structures that can be used to impart pivotability to body 104 relative to a user wearing fastener-stick dispenser 100, such as various hub and axle arrangements, ball-in-socket arrangements (such as a swivelable arrangement), among many others.

Each securing device 132 may optionally include one or more quick-connect features 136 that allow a user to disengage body 104 from at least the portion of each securing device that attaches to the user, to an article of clothing of the user, or to an accessory worn by the user. Such quick-connect feature(s) 136 allow(s) the user to keep the portion(s) of the securing-device(s) 132 secured to the user, tool-belt, or other article on the user while taking body 104 off, for example, for reloading, replacement, or swapping out for another receptacle portion containing different size and/or type fastener sticks. Examples of quick-connect features suitable for any of quick-connect feature 136 include, but are not limited to, spring-and-pin arrangements, latch arrangements, sliding interlock arrangements, snap-fit arrangements, and other mechanical interlock arrangements. Those skilled in the art will readily understand the wide variety of quick-connect features that can be used for each quick-connect feature 136, such that an exhaustive list need not be provided to enable the present invention to a broad scope.

The foregoing and other features can be combined with one another in various combinations to suit a particular embodiment and desired application. Benefits of a fastener-stick dispenser of the present disclosure include, but are not limited to, the fact that the dispenser can be made in a manner that keeps the fastener sticks safe, intact, and dry. A dispenser of the present disclosure can be made of any one or more suitable materials, such as plastic, metal, composite, etc. Following are several detailed examples of fastener-stick dispensers that include various features, including the features described above.

Figure 6:
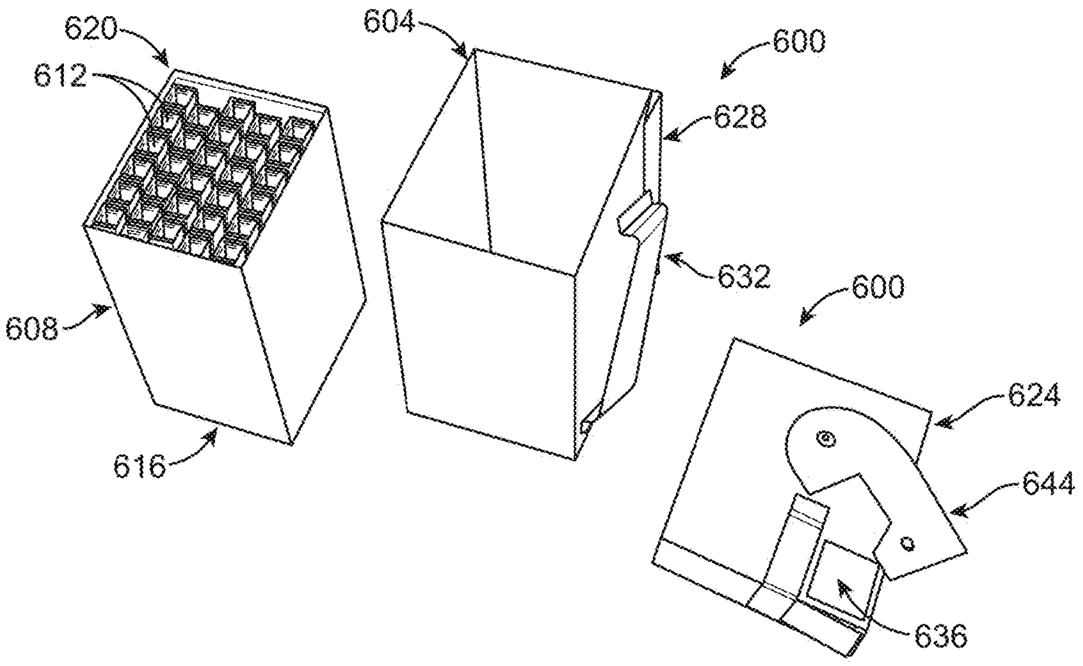
FIG. 6 is a top perspective view of components of a particular instantiation of a fastener-stick dispenser along with a box of staple sticks.

FIGS. 6-10 illustrate a first exemplary instantiation of a fastener-stick dispenser 600 of the present disclosure. Dispenser 600 includes a fastener-stick receptacle 604 for receiving, in this example, a prepackaged box of fastener sticks, here a box 608 of staple sticks 612 (only a few labeled for convenience) of which one end has been removed to expose the staple sticks and to prepare the box for use with the dispenser. Dispenser 600 may be referred to as a "top-loading" dispenser because each fastener-stick box is loaded into receptacle 604 closed end 616 first. As described above, other embodiments can be of another loading type, such as a bottom-loading type in which a box is inserted into the receptacle with its open end (see open end 620) first or a side-loading type in which a box is inserted into the receptacle in a lateral direction. Dispenser 600 includes an end-closure 624 that closes receptacle 604, for example, after box 608 has been loaded therein. FIG. 6 illustrates end-closure 624 removed from a main housing 628 of dispenser 600 that contains receptacle 604. A securing device, here a receiver 632 for receiving a belt, for securing dispenser 600 to a user. See also FIG. 10 for more detailed views of receiver 632.

Figure 7:
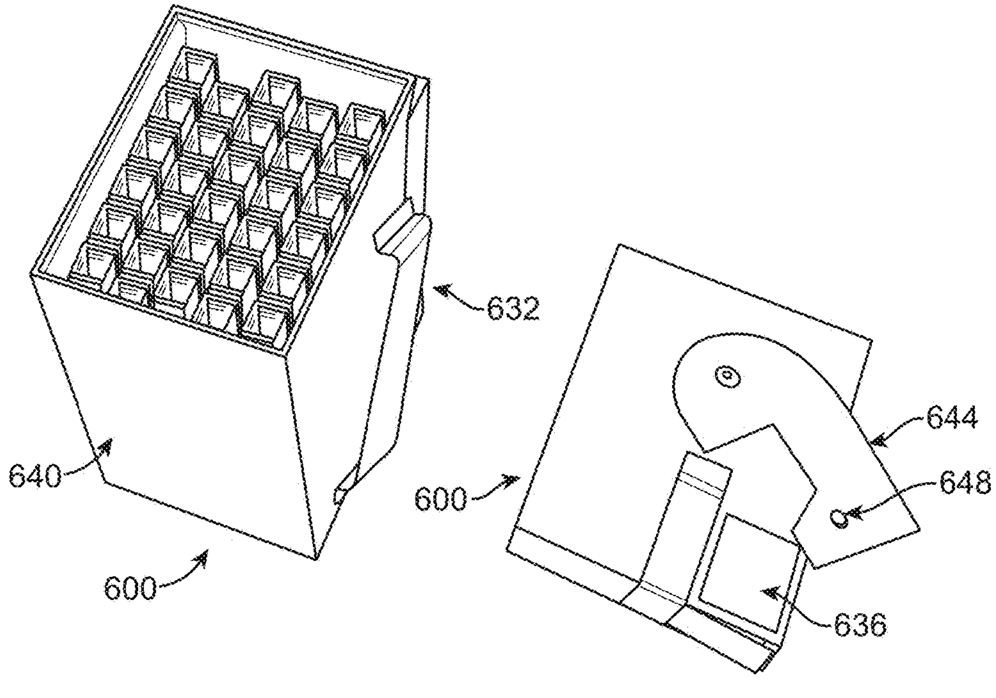
FIG. 7 is a top perspective view of the fastener-stick dispenser of FIG. 6, showing the box of staples inserted into the main housing of the dispenser.
Figure 8:
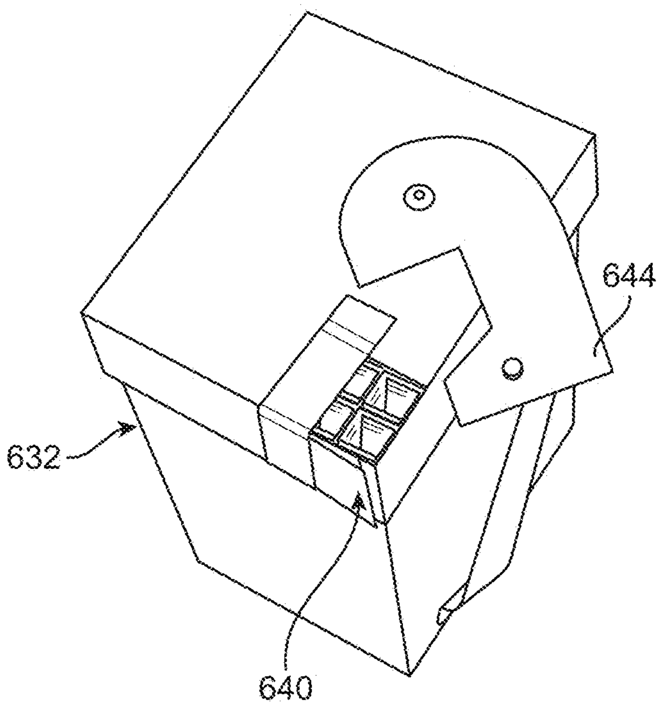
FIG. 8 is a top perspective view of the fastener-stick dispenser of FIG. 6, showing the dispensing-port closure in an open position.

Referring still to FIG. 6, and also to FIGS. 7 and 8, in this example end-closure 624 snap-fits to main housing 628. In other embodiments, end-closure 624 can be engaged with main housing 628 in any other suitable manner (not shown), such as via a hinge or sliding-groove engagement, among many others. Depending on how end-closure 624 is engaged with main housing 628, a latch or other securing means may be needed to hold the end-closure in a closed position. Because this embodiment of dispenser 600 is of the top-loading type, end-closure 624 includes a dispensing port 636 through which staple sticks 612 are dispensed during dispensing operations. As noted above, the dimensions of dispensing port 636 are customized to the size of the fastener sticks being dispensed, here staple sticks 612, so that only a set amount of sticks are dispensed at a time. Here, because staple sticks 612 are boxed in a partially nested manner, nested pairs of sticks easily slide along adjacent nested pairs of sticks such that a nested pair of sticks dispense together. As can be readily seen, dispensing port 636 is located in one corner 640 of end-closure 624 and dispenser 600. During dispensing, dispenser 600 is typically oriented so that corner 640 is at or near the lowest point of the dispenser so that with gentle shaking of the dispenser, any remaining staple sticks 612 (or nested stick pairs) in fastener stick receptacle 604 (FIG. 6) tend to settle into that corner. This ensures that staple sticks 612 are available for dispensing through dispensing port 636.

Figure 9:
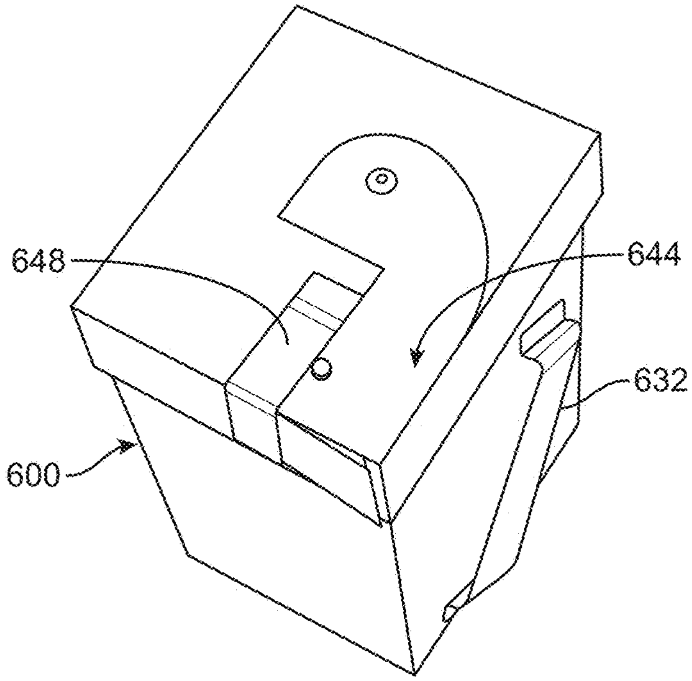
FIG. 9 is a top perspective view of the fastener-stick dispenser of FIG. 6, showing the dispensing-port closure in a closed position.
Figure 10:
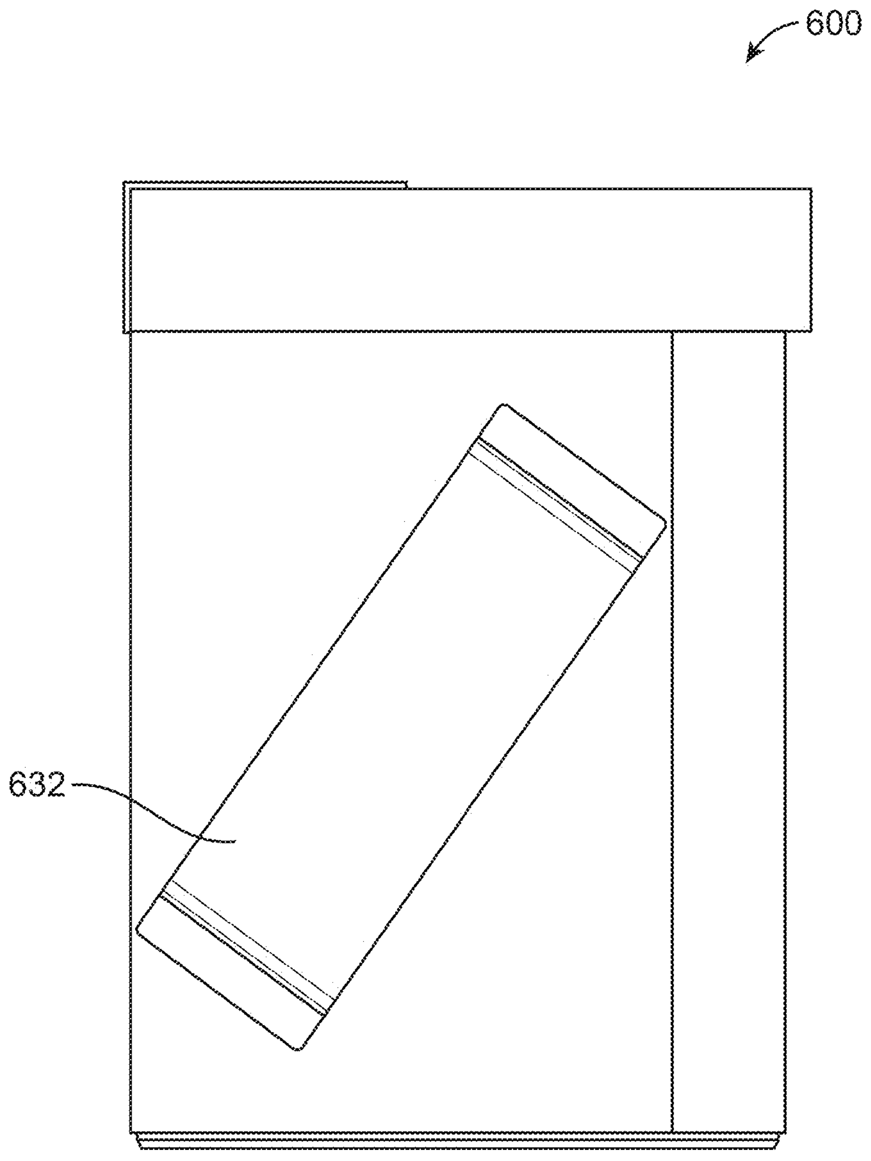
FIG. 10 is a side view of the fastener-stick dispenser of FIG. 6, showing the belt receiver.

In this embodiment, end-closure 624 also includes a dispensing-port closure 644 that a user uses to open and close dispensing port 620. In the example shown, dispensing-port closure 644 is a laterally rotatable closure that a user pivots in one direction to open dispensing port 636 and in the other direction to close the dispensing port. FIG. 9 shows dispensing-port closure 644 in a closed position. Dispensing port closure 644 include a knob 648 that allows the user to more readily move it between its closed and open positions. As mentioned above, dispensing-port closure 644 can be of another type, such as a hinged type that swings toward and away from dispensing port 636 or a longitudinally sliding closure, among others. In addition, in other embodiments knob 648 can be replaced with any other suitable structure(s), such as a finger-catch, dial, tab, etc., for helping the user move dispensing-port closure 644 between its open and closed positions, especially with gloved hands.

Figure 14:
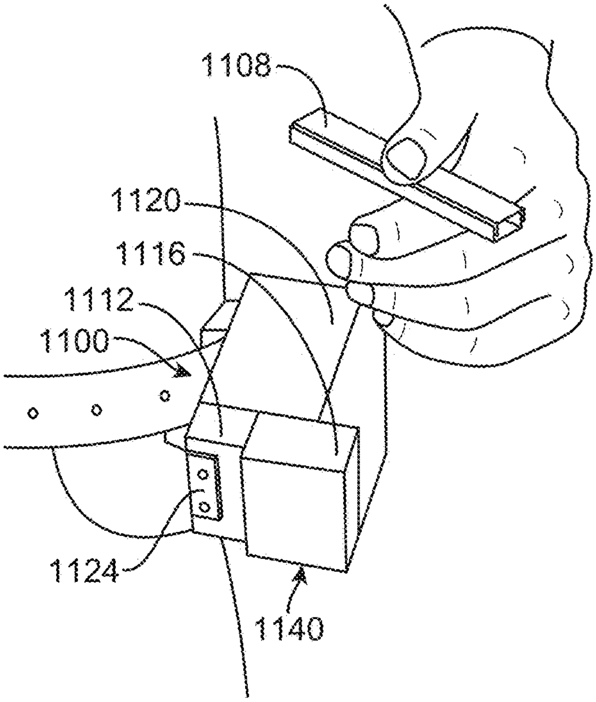
FIG. 14 is a front perspective view of the fastener-stick dispenser of FIG. 11, showing the dispensing-port closure in a closed position.
Figure 15:
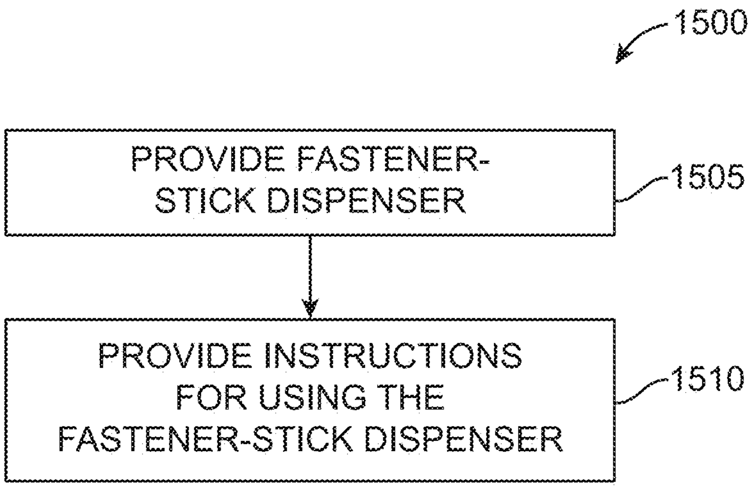
FIG. 15 is a flow diagram illustrating a method of providing a fastener-stick dispenser in accordance with an aspect of the present invention.

FIGS. 11-14 illustrate another top-loading fastener-stick dispenser 1100 that, like dispenser 600 of FIG. 6, is designed and configured to receive a prepackaged box 1104 (FIG. 11) of staple sticks 1108 (FIGS. 14 and 15). Dispenser 1100 of FIGS. 11-15 is largely the same as dispenser 600 of FIGS. 6-11, except that end-closure 1112 and dispensing-port closure 1116 of dispenser 1100 are different. In dispenser 1100, end-closure 1112 is pivotably attached to a body portion 1120 of the dispenser via a hinge 1124 that allows a user to open and close fastener-stick receptacle 1128 for inserting and removing a box of staple sticks, such as box 1104. In this example, end-closure 1112 has a snap fit with body portion 1120 such that no other securing means are needed. In the embodiment shown, dispensing-port closure 1116 is pivotably attached end-closure 1112 via a hinge (not shown) that allows it to be pivoted relative to the end-closure in a plane that is oriented 90° relative to the plane in which the dispensing-port closure is pivotable. As those skilled in the art will readily appreciate, when end-closure 1112 is pivoted, since dispensing-port closure 1116 is secured to the end-closure, the dispensing-port closure pivots therewith. Dispensing port (barely seen in FIG. 11 at 1132) is in essentially the same overall location relative to dispenser 1100 as dispensing port 636 relative to dispenser 600 of FIGS. 6-11.

While dispenser 1100 is shown in FIGS. 11-14 with a fixed receiver 1136 (securing device), in other embodiments the dispenser can be pivotably mounted, for example, to a securing device. This would allow a user to pivot dispenser 1100 between an upright position, for example, for ease of loading, and a dispensing position in which corner 1140 is moved to a low point to facilitate dispensing by sliding of a staple stick pair in that corner through dispensing port 1132. With such pivoting capability, dispenser can be used as follows. A worker can mount dispenser 1100 on his/her work-belt in any chosen location. The worker can pivot dispenser 1100 on its bracket so that hinged end-closure 1112 is at the top. The, the worker opens hinged end-closure 1112 and inserts, into fastener-stick receptacle 1128, an industry standard cardboard box 1104 of staple sticks 1108 having all or a relevant portion of its top cut removed to expose the ends of at least the staple sticks that will be located at dispensing port 1132. The worker can then close hinged end-closure 1112 and pivot dispenser 1100 to any desired orientation. When ready for dispensing, the worker can pivot dispenser 1100 into whatever attitude he/she chooses so that dispensing port 1132 is pointing, for example, about 45° downward and frontward. Dispenser 1100 is now ready for dispensing. The worker can wear dispenser 1100 whether it is being used or not. When the worker needs a staple stick, he/she can lift dispensing-port closure 1116 and allow a pair of staple sticks to drop into his/her hand. This is a one-handed maneuver that may require only a very small bit of practice to master. Once the worker has the needed staple sticks in hand, he can either close dispensing-port closure 1116 or allow the closure to close on its own, for example, if it is spring-loaded or otherwise is biased toward its closed position. In either of these manners, the closing of dispensing-port closure 1116 will push any other sticks back into dispenser 1100 for later dispensing.

Figure 11:
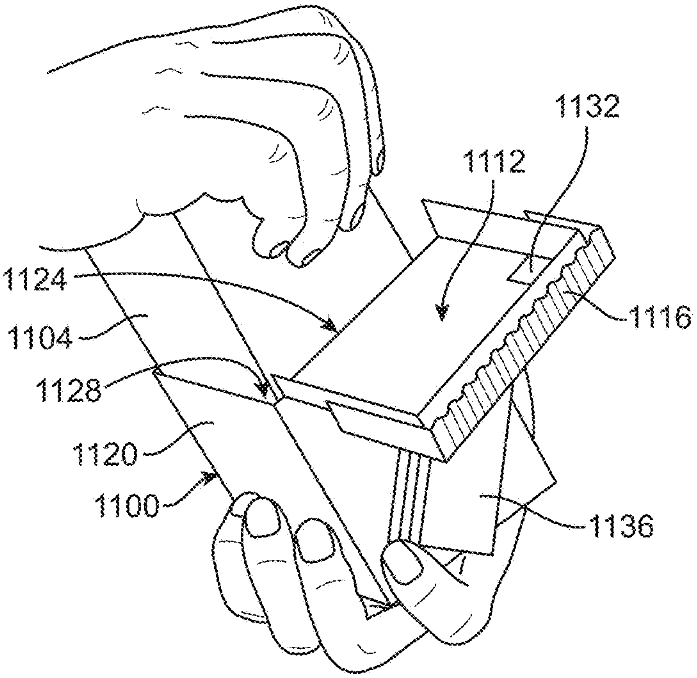
FIG. 11 is a perspective view of another instantiation of a fastener-stick dispenser, showing a box of fasteners being loaded into the fastener-stick receptacle.
Figure 12:
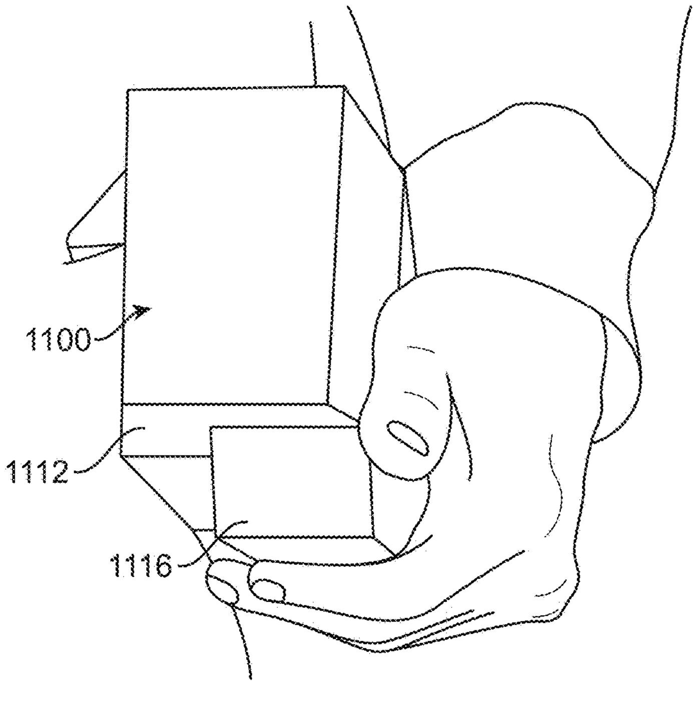
FIG. 12 is a front elevational view of the fastener-stick dispenser of FIG. 11, showing the body of the dispenser in an inverted orientation.
Figure 13:
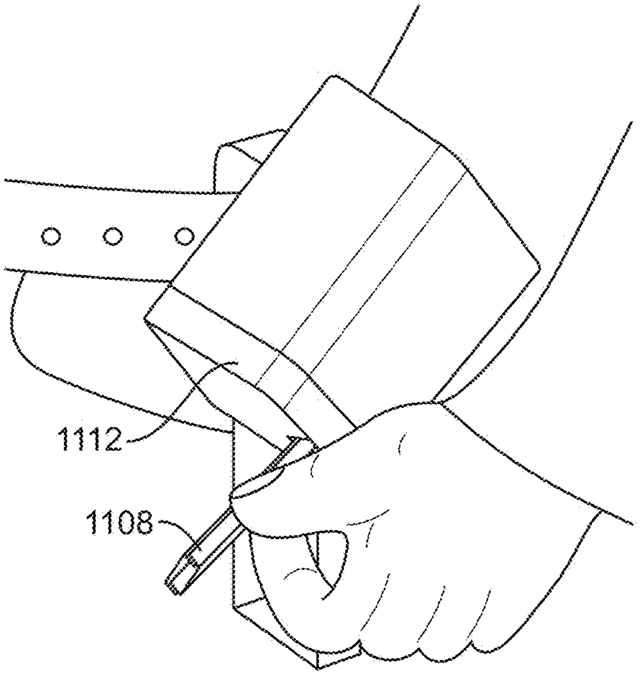
FIG. 13 is front/side perspective view of the fastener-stick dispenser of FIG. 11, showing the body of the dispenser in a dispensing orientation and a fastener stick being dispensed.

FIG. 15 illustrates a method 1500 of providing a fastener-stick dispenser, such as fastener-dispenser 100 of FIG. 1, fastener-stick dispenser 600 of FIG. 6, or fastener-stick dispenser 1100 of FIG. 11, and any variant thereof, including the variants shown in FIGS. 3A to 5 and described herein, and any combination thereof. At step 1505, the fastener-stick dispenser is provided. The providing of the fastener-stick dispenser at step 1505 may be in any suitable context, such as a sale or give-away promotion, among others. The fastener-stick dispenser provided at step 1605 may include: 1) a body defining a fastener-stick receptacle designed and configured to receive a bundle of fastener sticks; 2) a dispensing port designed, configured, and located for controllably dispending ones of the fastener sticks in the bundle when the bundle is installed into the fastener-stick receptacle; 3) a dispensing-port closure designed and configured to be actuated by a user to alternatingly open and close the dispensing port during a dispensing operation; and 4) a securing device designed and configured for securing the fastener-stick dispenser to the user.

At step 1510, instructions are provided for using the fastener-stick dispenser. The instructions provided at step 1510 may be provided in any suitable manner, such as in print, picture, or video form, or any combination thereof. The instructions may include instructions instructing a user how to load fastener sticks into the fastener-stick receptacle of the fastener-stick dispenser and instructions instructing the user how to dispense fastener sticks from the dispenser. As those skilled in the art will readily appreciate, the instructions for loading fastener sticks into the fastener-stick receptacle will vary depending on a number of factors, including the type of fastener sticks, the nature of the bundling of the fastener sticks (e.g., via prepackaging, such as a box), and the configuration of the body of the dispenser. A number of variations of these factors are described above. As an example, for a top-closure type fastener-stick dispenser designed and configured to receive a prepackaged box of fasteners, such as either of fastener-stick dispensers 600 and 1100 of FIGS. 6 and 11, respectively, the instructions may include instructions on removing, folding, or otherwise moving out of the way a portion of the box of the fastener sticks, opening the fastener-stick receptacle, inserting the box into the fastener-stick receptacle, and closing the fastener-stick receptacle. Similarly, those skilled in the art will readily appreciate that the instructions for instructing a user how to dispense fastener sticks from the fastener-stick dispenser will vary depending on a variety of factors, including the location of the dispensing port, the configuration of the dispensing-port closure, and how, if at all, the body of the dispenser needs to be moved during dispensing and any other operations.

Referring now to FIGS. 16-18, these figures depict and exemplary fastener-stick dispenser 1600 that, generally, is designed and configured to dispense fastener sticks, such as staple sticks 1604 (only a few labeled for convenience) engaged with one another to form "nested" staple stick pairs 1608 (only a few labeled for convenience) as shown, in a direction 1612 perpendicular to a longitudinal axis, such as longitudinal axis 1616, of any one of the fastener sticks. In the exemplary embodiment, fastener-stick dispenser 1600 includes a housing 1620 and a dispensing mechanism 1624. Housing 1620 includes a fastener-stick dispensing receptacle 1628 designed and configured to hold a plurality of nested staple-stick pairs 1608 for feeding the staple-stick pairs to dispensing mechanism 1624 as described below. Of course, those skilled in the art will readily appreciate that exemplary fastener-stick dispensing receptacle 1628 and dispensing mechanism 1624 are specifically designed and configured for dispending nested staple-stick pairs 1608 and that design changes can be made to accommodate other types of stick fasteners, such as nail sticks, among others. In this example, the height H (FIG. 18) of fastener-stick dispensing receptacle 1628 is sized to accommodate the entire content of a package of staple stick pairs 1608, such as package 1632 (FIG. 16). As for the length (in the direction into and out of the page relative to FIG. 18) and the width W (FIG. 18) of fastener-stick dispensing receptacle 1628, those skilled in the art will readily appreciate that these dimensions may be slightly greater than, respectively, the length and width of staple sticks pairs 1608 to minimize the amount of play of the pairs in those directions. Those skilled in the art know that fastener sticks can be purchased in other types of packaging, such as box 200 illustrated in FIG. 2. Fastener-stick dispensing receptacle 1628 can be sized according to some other criterion, such as limiting the overall size and/or weight of fastener-stick dispenser or providing a user with a reasonable amount of fastener sticks for a given work period, among others.

Dispensing mechanism 1624 includes a fastener-stick receiving region 1636 that, in this case, receives one at a time, nested fastener-stick pairs 1608 as part of the dispensing process. Depending on the construction of dispensing mechanism 1624, fastener-stick dispensing region 1636 may be formed in any suitable manner. For example, dispensing mechanism 1624 depicted in the present embodiment may be considered to have a body 1640 extending along the length of dispenser 1600, which in FIGS. 16-18 is in a direction into and out of the page containing these figures. Fastener-stick receiving region 1636 may be a channel-shaped recess having a rectangular cross-sectional shape sized to accommodate a single one of nested fastener-stick pairs 1608 with enough play to ensure reliable reception of each nested fastener-stick pair into the fastener-stick receiving region and to ensure that dispensing mechanism 1624 does not bind upon dispensing. As those skilled in the art will readily appreciate, body 1640 may have any of a variety of constructions, and correspondingly channel-shaped fastener-stick receiving region 1636 may be formed in a variety of ways. For example, if body 1640 is a solid body, then fastener-stick receiving region 1636 may be provided as a groove formed in the solid body. As another example, if body 1640 is more of a hollow member having a continuous shell, then fastener-stick receiving region 1636 may be formed by providing a depressed region in the shell. As yet another example, if body 1640 is made of a plurality of bulkhead-like structures spaced in a direction parallel to longitudinal axes 1616 of fastener sticks 1604, then fastener-stick receiving region 1636 may be defined by rectangular notches in the plurality of bulkhead-like structures that are aligned with one another to effectively define a channel region along the length of the body. Of course, other constructions are possible.

In the example shown, dispensing mechanism 1624 is a pivoting-type mechanism having a pivot axis 1644 about which body 1640 pivots during a dispensing operation so as to dispense one or more fastener sticks, here nested fastener-stick pairs 1608, in direction 1612 as noted above. In this example, body 1640 is pivotably coupled to housing 1620 at each end of dispenser 1600, such as via an axle 1700 (FIG. 17) that engages dispensing mechanism supports (only the near support 1704 seen in FIG. 17; a similar support is present at the opposite end of the dispenser) that depend from the housing. FIG. 16 illustrates fastener-stick receiving region 1636 in a fastener-stick receiving position 1648 in which the fastener-stick receiving region is in operative communication with dispensing receptacle 1628 to allow the next nested fastener-stick pair 1608 to fall into the fastener-stick receiving region by force of gravity when the fastener-stick receiving region is moved back into the fastener-stick receiving position after dispensing a prior nested fastener-stick pair. Correspondingly, FIG. 18 illustrates fastener-stick receiving region 1636 in a dispensing position 1800 in which the fastener-stick receiving region makes the nested fastener-stick pair 1608 being dispensed available to a user, for example, for a user to grab, catch, or otherwise engage with her/his hand.

In the embodiment shown, body 1640 is pivotable so as to move fastener-stick receiving region 1636 from fastener-stick receiving position 1648 (FIG. 16) to dispensing position 1800 (FIG. 18) using an actuator, here a lever arm 1652 that a user can push or pull on to pivot the body. In the embodiment shown, lever arm 1652 includes push portion 1656 that curves away from housing 1620 to allow a user to push on an upper surface 1656A of the push portion with the fingers or palm of her/his hand to pivot dispensing mechanism 1624 counterclockwise in FIGS. 16 and 18 to move fastener-stick receiving region 1636, and nested fastener-stick pair 1608 contained therein, from fastener-stick receiving position 1648 to dispensing position 1800 (FIG. 18) to dispense the nested fastener-stick pair. In this example, pivotable body 1640 is biased via one or more biasing devices, for example, one or more springs 1660, so that fastener-stick receiving region 1636 returns to fastener-stick receiving position 1648 when the user has stopped pushing/pulling on lever arm 1652.

It is noted that lever arm 1652 can be sized and located in a number of ways. For example, lever arm 1652 can be sized to extend a substantial portion or entire amount of the length of housing 1620 (into and out of the page of FIG. 16). As another example, lever arm 1652 may be located only on one end (into and out of the page of FIG. 16) or between the two ends. In other embodiments multiple lever arms, such as one at either end of housing 1620 may be provided. Those skilled in the art will readily appreciate the variety of ways for implementing a lever-arm based embodiment.

As seen in FIGS. 16 and 18, this embodiment of dispenser 1600 also includes a storage receptacle 1804 (FIG. 18), which in this example is sized to hold entire package 1632 of staple sticks 1604, packaging 1632A and all. In this example, package 1632 is a hanging type package, with packaging 1632A including a hang-tab portion 1632B that a user can fold over as illustrated by arrows 1632C in FIG. 16 for storing in storage receptacle 1804. As seen in FIG. 18, housing 1620 in this example is configured with a back wall 1620A that is shorter than an intermediate wall 1620B that separates storage receptacle 1804 from dispensing receptacle 1628. This is to allow the user to easily remove package 1632 from storage receptacle 1804. FIG. 18 shows that in this embodiment, dispenser 1600 includes a pivoting closure 1808 that when in the closed position 1812 shown in FIG. 18 closes both dispensing receptacle 1628 and storage receptacle 1804. Pivoting closure 1808 extends the entire length of housing 1620 and is pivotably attached to a front wall 1620C of the housing, for example, using a hinge 1816. Pivoting closure 1808 may be held in closed position 1812 such as by interference fit with a back wall 1620A of housing 1620, for example, between a tab and groove arrangement (not shown). Those skilled in the art will readily understand that any of a wide variety of mechanisms can be used to securely hold pivoting closure 1808 in closed position 1812 until the user wants to open dispenser 1620 by moving the pivoting closure to an open position (not shown). In other embodiments, a different type of closure can be used and/or each receptacle 1628 and 1804 may have its own closure. It is also noted that the embodiment shown has a top-loading configuration, but other configurations, such as an end loading configuration in which the staple-stick pairs 1608 are loaded in a direction parallel to their longitudinal axes, can be used.

Dispenser 1600 includes one or more securing devices 1672 for securing the dispenser to a user or an article of clothing or accessory worn by the user. Examples of securing devices include, but are not limited to, belt loops, belt clips, belts, straps, lanyards, and hooks, among others. In the example shown, a belt clip is provided as the sole securing device 1672.

To use dispenser 1600, a user (not shown) may load dispensing receptacle 1628 with one or more staple-stick paris 1608, for example by loading the dispensing receptacle with the entire contents of a package of staple sticks, such as package 1632. The user may also load a second package 1632 into storage receptacle 1804 and close pivoting closure 1808. If dispenser 1600 is not already secured to the user's belt (not shown), the user may use belt-clip securing device 1672 to the user's belt. When the user desired to dispense a staple-stick pair 1608, the user actuates dispensing mechanism 1624 by pivoting lever arm 1652 away from the upper portion of housing 1620 to pivot fastener-stick receiving region 1626 from fastener receiving position 1648 (FIG. 16) to fastener dispensing position 1800 (FIG. 18). When lever arm 1652 runs the full length (into and out of the page of FIG. 16), the use may pivot lever arm 1652 using fingertips pushing on push portion 1656 so that when the lever arm is sufficiently pivoted, such as shown in FIG. 18, the dispensed fastener stick pair 1608 fall by gravity into the users waiting hand (not shown). In other embodiments having lever arm 1652 located and configured differently, such as at only one or both ends, the user may push with her/his thumb to pivot the lever arm to dispense a fastener-stick pair 1608 and have her/his fingers and/or palm positioned to catch the fastener-stick pair as it falls out of fastener-stick receiving region 1626 when that region is in dispensing position 1800 (FIG. 18). Those skilled in the art will readily appreciate that the dispensing process may alternatively utilize two hands, with on hand actuating lever arm 1652 and the other hand receiving the dispensed fastener-stick pair 1608.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A fastener-stick dispenser designed and configured for holding a plurality of nested staple-stick pairs and dispensing ones of the plurality of nested staple-stick pairs, the fastener-stick dispenser comprising:

a housing defining a fastener-stick dispensing receptacle designed and configured to contain the plurality of nested staple-stick pairs for dispensing;

at least one component coupled to said housing and designed and configured to dispense a single nested staple-stick pair from the plurality of nested staple-stick pairs each time a user performs a dispensing protocol using said at least one component when the user is wearing the fastener-stick dispenser; and a securing device attached to said housing, said securing device designed and configured to secure said fastener-stick dispenser to clothing worn by a user;

wherein:

each of the plurality of nested staple-stick pairs has a longitudinal axis;

said at least one component comprises a dispensing mechanism pivotably coupled to said housing so as to be pivotable about a pivot axis, said dispensing mechanism including:

a fastener-stick receiving region designed and configured to receive, from said fastener-stick dispensing receptacle, one nested staple-stick pair of the plurality of nested staple-stick pairs so that the longitudinal axis of the plurality of nested staple-stick pairs is parallel to said pivot axis, said fastener-stick receiving region having:

a receiving position that is in operative communication with said fastener-stick receptacle;

a dispensing position located outside of said housing; and an actuator designed and configured, upon actuation by a user, to move said fastener-stick receiving region from said receiving position to said dispensing position in a direction perpendicular to the longitudinal axis of the nested staple-stick pair in said fastener-stick receiving region so as to make the nested staple-stick pair in said fastener-stick receiving region available to the user, wherein said actuator includes a lever arm having a hand-engaging region designed and configured to be engaged by a hand of the user so that the user can pivot said fastener-stick receiving region from said receiving position to said dispensing position by pivoting said lever arm in a direction away from said housing;

further wherein:

the housing includes a front side and a back side, said fastener-stick dispensing receptacle located between said front and back sides and said securing device attached to said back side of said housing, an intermediate wall located between said front and back walls and separating said fastener-stick dispensing receptacle from said storage receptacle;

the fastener-stick dispenser is designed and configured to receive the plurality of nested fastener-stick pairs such that the longitudinal axes of the plurality of fastener-stick pairs are parallel to said pivot axis of said dispensing mechanism;

at least a portion of the lever arm is located adjacent to said front side of said housing when the fastener-stick dispensing region is in said receiving position; and when the user is wearing the fastener:

said fastener-stick receiving region of said dispensing mechanism is located below said fastener-stick dispensing receptacle when said fastener-stick receiving region is in said receiving position; and said dispensing mechanism is designed and configured to dispense, into the hand of the user and above said lever arm, the nested staple-stick pair present in said fastener-stick receiving region as the user pivots said lever arm so as to cause said dispensing mechanism to dispense the nested staple-stick pair present in said fastener-stick receiving region.

2. A fastener-stick dispenser system, comprising:

the fastener-stick dispenser of claim 1; and the plurality of nested staple-stick pairs contained in said fastener-stick dispensing receptacle.

3. A fastener-stick dispenser according to claim 1, wherein said dispensing mechanism includes a pivotable body comprising said receiving region, said pivotable body coupled to said housing so as to be pivotable about said pivot axis.

4. A fastener-stick dispenser according to claim 3, wherein said fastener-stick receiving region comprises a channel-shaped recess formed in said body and having a longitudinal axis extending parallel to said pivot axis.

5. A fastener-stick dispenser according to claim 4, wherein said pivotable body is biased by a spring so that said fastener-stick receiving region is biased into said receiving position.

6. A fastener-stick dispenser according to claim 1, wherein said housing has a length parallel to said pivot axis, and said lever arm has a length along said housing that is substantially equal to said length of said housing.

7. A fastener-stick dispenser according to claim 1, further comprising a storage receptacle that is not in operative communication with said fastener-stick receiving region.

8. A fastener-stick dispenser according to claim 7, wherein the nested staple-stick pairs are sold in packages containing multiple nested staple-stick pairs and said storage receptacle is designed and configured to receive at least one of the packages.

9. A fastener-stick dispenser according to claim 8, further comprising a closure designed and configured to close both of said fastener-stick dispensing receptacle and said storage receptacle.

10. A fastener-stick dispenser system, comprising:

the fastener-stick dispenser of claim 1; and the plurality of nested staple-stick pairs contained in each of said fastener-stick dispensing receptacle and said storage receptacle.

11. A fastener-stick dispenser according to claim 8, wherein said intermediate wall and said back wall partially define said storage receptacle, said intermediate wall having a first height and said back wall having a second height lower than said first height.

12. A fastener-stick dispenser according to claim 8, wherein said storage receptacle is designed and configured to snugly receive only a single one of the packages.

13. A fastener-stick dispenser according to claim 12, wherein each of the packages has a fastener content, and said fastener-stick dispenser receptacle is designed and configured to snugly receives the entirety of the fastener content of one of the packages.

14. A fastener-stick dispenser according to claim 13, further comprising a closure designed and configured to close both of said fastener-stick dispensing receptacle and said storage receptacle.

15. A fastener-stick dispenser according to claim 14, wherein said closure is pivotably secured to said front wall of said housing.

16. A fastener-stick dispenser according to claim 15, wherein said securing device is secured to said back wall of said housing.

17. A fastener-stick dispenser according to claim 16, wherein said securing device comprises a belt clip.

* * * * *